United States Patent
Englund et al.

(10) Patent No.: US 11,065,822 B2
(45) Date of Patent: Jul. 20, 2021

(54) BINDING MACHINE AND METHOD FOR SECURING A PART OF A BINDING ELEMENT IN A LOOP AROUND ONE OR MORE OBJECTS

(71) Applicant: SUND BIRSTA AB, Sundsvall (SE)

(72) Inventors: Ove Englund, Stockholm (SE); Peter Mårstedt, Stockholm (SE); Erik Danielsson, Sundsvall (SE)

(73) Assignee: Sund Birsta AB, Sundsvall (SE)

( * ) Notice: Subject to any disclaimer, the term of this patent is extended or adjusted under 35 U.S.C. 154(b) by 120 days.

(21) Appl. No.: 16/484,550

(22) PCT Filed: Feb. 14, 2018

(86) PCT No.: PCT/EP2018/053609
§ 371 (c)(1),
(2) Date: Aug. 8, 2019

(87) PCT Pub. No.: WO2018/149842
PCT Pub. Date: Aug. 23, 2018

(65) Prior Publication Data
US 2020/0001542 A1 Jan. 2, 2020

(30) Foreign Application Priority Data
Feb. 17, 2017 (EP) .................................. 17156595

(51) Int. Cl.
*B65B 13/06* (2006.01)
*B29C 65/16* (2006.01)
(Continued)

(52) U.S. Cl.
CPC ............ *B29C 65/16* (2013.01); *B23K 26/244* (2015.10); *B29C 65/7473* (2013.01);
(Continued)

(58) Field of Classification Search
CPC .... B23K 26/244; B23K 26/38; B29C 59/007; B29C 65/1638; B65B 13/04; B65B 13/06
See application file for complete search history.

(56) References Cited

U.S. PATENT DOCUMENTS

| 3,759,169 A * | 9/1973 | Goodley | ................. B65B 13/06 100/29 |
| 3,863,557 A * | 2/1975 | Takahashi | ............... B65B 13/32 100/33 PB |

(Continued)

FOREIGN PATENT DOCUMENTS

| CH | 557 263 A | 12/1974 |
| JP | 2005-158825 A | 6/2005 |
| WO | 2017/129679 A1 | 8/2017 |

*Primary Examiner* — Scott W Dodds
(74) *Attorney, Agent, or Firm* — Dilworth & Barrese, LLP

(57) ABSTRACT

A binding machine comprising: —a feeding device for feeding a binding element (3) in the form of a wire or strap around one or more objects and subsequently retracting the binding element to draw it tightly around said objects; and —a laser welding device (12) for forming a welded joint between a first section at the leading end of the binding element and an adjoining second section at the trailing end of the part (3a) of the binding element fed around said objects to thereby secure this part of the binding element in a loop around the objects. The laser welding device directs a laser beam onto an area (30) at the trailing end of said second section in order to reduce the tensile strength of the binding element, wherein the feeding device retracts the binding element in order to subject this area to tensile stress and thereby cause the binding element to be broken off.

20 Claims, 6 Drawing Sheets

(51) Int. Cl.
   *B29C 65/74*    (2006.01)
   *B23K 26/244*   (2014.01)
   *B23K 103/00*   (2006.01)
   *B23K 101/16*   (2006.01)
   *B29C 65/78*    (2006.01)
   *B29C 65/00*    (2006.01)
   *B29C 59/00*    (2006.01)

(52) U.S. Cl.
   CPC ...... *B23K 2101/16* (2018.08); *B23K 2103/42* (2018.08); *B29C 59/007* (2013.01); *B29C 65/1638* (2013.01); *B29C 65/7841* (2013.01); *B29C 66/1122* (2013.01); *B65B 13/06* (2013.01)

(56) References Cited

U.S. PATENT DOCUMENTS

| | | |
|---|---|---|
| 4,945,203 A | 7/1990 | Soodak et al. |
| 6,403,917 B1 | 6/2002 | Helldörfer |
| 2011/0070390 A1 | 3/2011 | Costin, Sr. et al. |
| 2012/0098189 A1 | 4/2012 | Meersoek |

\* cited by examiner

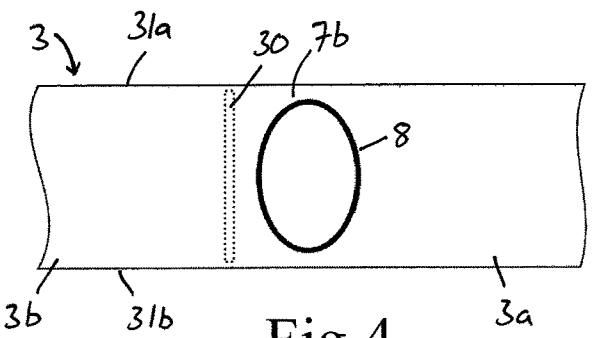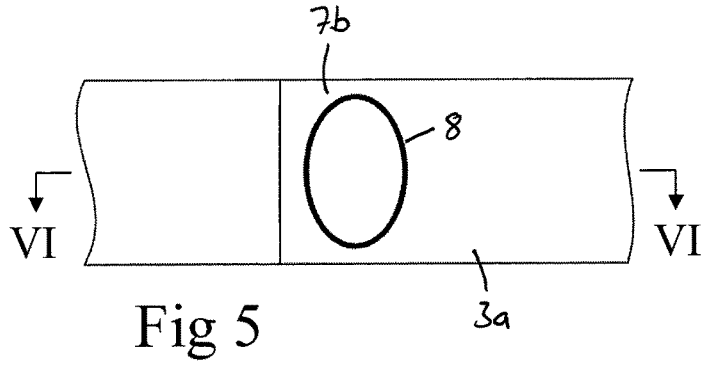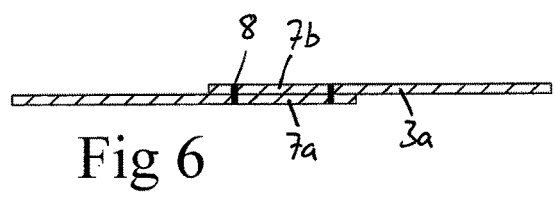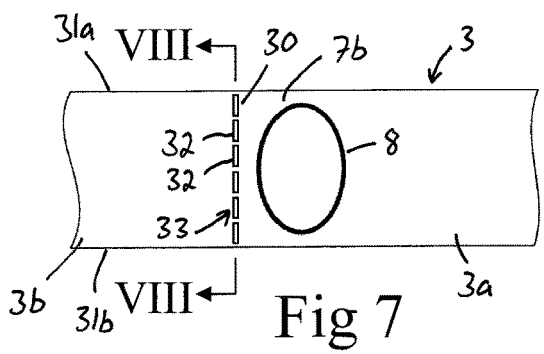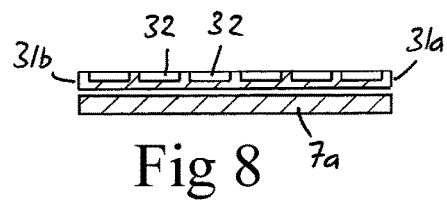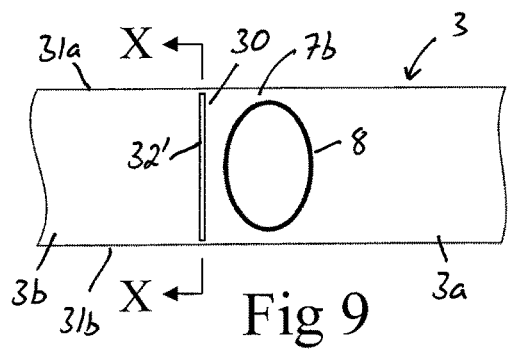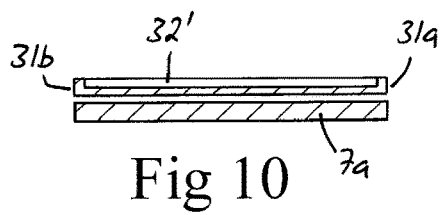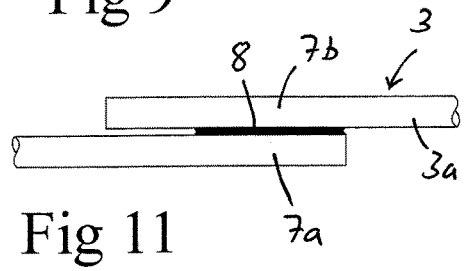

BINDING MACHINE AND METHOD FOR SECURING A PART OF A BINDING ELEMENT IN A LOOP AROUND ONE OR MORE OBJECTS

FIELD OF THE INVENTION AND PRIOR ART

The present invention relates to a binding machine according to the description herein. The invention also relates to a method according to the description herein for securing a part of an elongated binding element in a loop around one or more objects.

Automatic binding machines for applying a binding element in the form of a strap or wire in a loop around an object or a bundle of objects, drawing the binding element tightly around the object/bundle and thereafter joining overlapping sections of the binding element in order to secure the binding element around the object/bundle are known in many different configurations. U.S. Pat. No. 6,403,917 B1 discloses a binding machine where a laser welding device is used for forming a welded joint between overlapping sections of a binding element in the form of a strap to thereby secure the binding element in a loop around an object or a bundle of objects.

SUMMARY OF THE INVENTION

The object of the present invention is to achieve a new and favourable binding machine of the above-mentioned type.

According to the invention, this object is achieved by a binding machine having the features defined herei.

The binding machine of the present invention comprises:
- a feeding device for feeding an elongated binding element in the form of a wire or strap in a loop around a space configured for receiving one or more objects to be bound and subsequently retracting the binding element to draw it tightly around one or more objects received in said space;
- a gripping device for gripping and locking a first binding element section at the leading end of the binding element after the feeding of a part of the binding element in a loop around said space; and
- a laser welding device for forming a welded joint between said first binding element section and an adjoining second binding element section at the trailing end of the part of the binding element fed in a loop around said space to thereby secure this part of the binding element in a loop around said one or more objects, wherein the laser welding device and the feeding device are controlled by means of an electronic control device included in the binding machine.

According to the invention, the laser welding device and the feeding device are also used for releasing the part of the binding element secured in a loop around said one or more objects from the remaining part of the binding element. This is achieved in that the laser welding device is made to direct a laser beam onto an area across the binding element at the trailing end of the second binding element section in order to reduce the tensile strength of the binding element at the trailing end of the second binding element section, wherein the feeding device is made to retract the binding element in order to subject said area to tensile stress and thereby cause the binding element to be broken off at the trailing end of the second binding element section. Hereby, no separate cutting member is required for severing the binding element, which will reduce the complexity of the binding machine. Furthermore, with the solution according to the invention, the binding element may be broken off without the laser beam having to cut through the binding element, which implies that the process can be performed very rapidly and without running the risk of damaging the part of the binding element loop below the second binding element section by a penetrating laser beam.

According to an embodiment of the invention, the electronic control device is configured to control the laser welding device to reduce the tensile strength of the binding element at the trailing end of the second binding element section by heating said area under the effect of said laser beam and without cutting into the binding element. The fact that the binding element is heated under the effect of the laser beam instead of being evaporated and desorbed under the effect of the laser beam implies that the formation of sparks caused by the laser beam is avoided or at least minimized.

Further advantageous features of the binding machine according to the present invention will appear from the following description and the dependent claims.

The invention also relates to a method having the features defined herein.

Further advantageous features of the method according to the present invention will appear from the following description and the dependent claims.

BRIEF DESCRIPTION OF THE DRAWINGS

With reference to the appended drawings, a specific description of preferred embodiments of the invention cited as examples follows below. In the drawings:

FIG. 4 is a planar view from above of a part of a binding element in the form of a strap secured in a loop around one or more objects to be bound, illustrating a heating area on the binding element before the binding element loop has been released from the remaining part of the binding element, FIG. 5 is a planar view corresponding to FIG. 4, as seen when the binding element loop has been released from the remaining part of the binding element, FIG. 6 is a cut according to the line VI-VI in FIG. 5, FIG. 7 is a planar view from above of a part of a binding element in the form of a strap secured in a loop around one or more objects to be bound, illustrating a break line on the binding element before the binding element loop has been released from the remaining part of the binding element, FIG. 8 is a cut according to the line VIII-VIII in FIG. 7, FIG. 9 is a planar view from above of a part of a binding element in the form of a strap secured in a loop around one or more objects to be bound, illustrating an alternative type of break line on the binding element before the binding element loop has been released from the remaining part of the binding element, FIG. 10 is a cut according to the line X-X in FIG. 9, and FIG. 11 is a planar view from above of a part of a binding element in the form of a wire secured in a loop around one or more objects to be bound.

DETAILED DESCRIPTION OF EMBODIMENTS OF THE INVENTION

Figure 1:
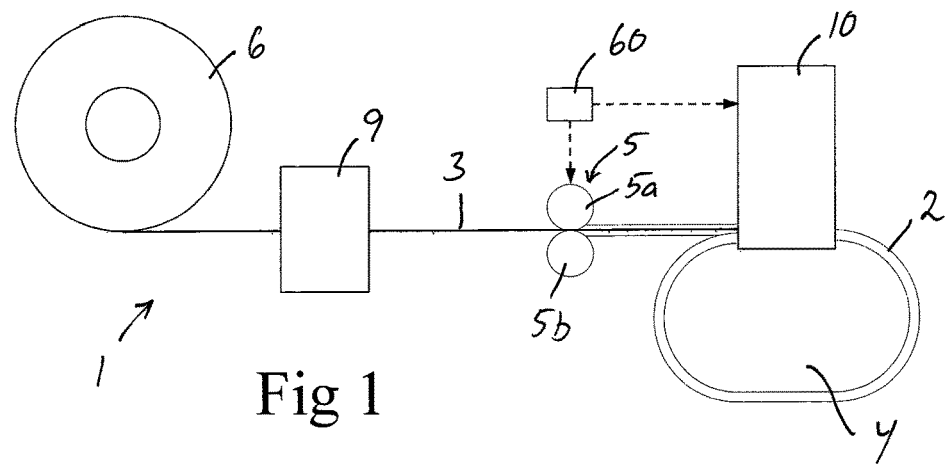
FIG. 1 is an outline diagram of a binding machine according to an embodiment of the present invention.

Some of the parts included in a binding machine 1 according to an embodiment of the present invention are very schematically illustrated in FIG. 1. The binding machine 1 comprises:

- a guide track 2 for guiding an elongated binding element 3 in the form of a wire or strap in a loop around a space 4 configured for receiving one or more objects to be bound;
- a feeding device 5 for feeding the binding element 3 from a supply coil 6, into said guide track 2 and along the guide track in a loop around said space 4 and subsequently retracting the binding element 3 to draw it tightly around one or more objects received in said space 4;
- an accumulator 9 for temporarily accumulating a part of the binding element 3 when the binding element is retracted by the feeding device 5 and then releasing the accumulated part of the binding element when the binding element thereafter is fed forwards by the feeding device 5; and
- a sealing unit 10 for securing the binding element 3 around said one or more objects.

The guide track 2 may for instance have the form of a rail with a longitudinal opening facing said space 4. For the sake of clarity, the guide track 2 has been omitted in FIGS. 2e-2g.

In the illustrated embodiment, the feeding device 5 comprises two rotatable feed rollers 5a, 5b, which are located opposite each other and configured to be in contact with opposite sides of a part of the binding element 3 received in the nip between the feed rollers. At least one of the feed rollers 5a, 5b is rotatably driven by an actuator (not shown) in the form of a reversible drive motor in order to move the binding element 3 in its longitudinal direction. The drive motor is preferably an electric motor, but it could as an alternative be a hydraulic or pneumatic motor. The feeding device 5 may also comprise any other suitable type of actuator for feeding and retracting the binding element 3.

Some of the parts included in the above-mentioned sealing unit 10 are very schematically illustrated in FIGS. 2a-2h. The sealing unit 10 comprises:

- a gripping device 11 for gripping and locking a first binding element section 7a (see FIGS. 2b and 2c) at the leading end of the binding element after the feeding of a part 3a of the binding element in a loop around said space 4; and
- a laser welding device 12 (see FIG. 2a) for forming a welded joint 8 (see FIG. 2e-2h) between said first binding element section 7a and an adjoining second binding element section 7b at the trailing end of the part 3a of the binding element fed in a loop around said space 4 to thereby secure this part 3a of the binding element in a loop around said one or more objects.

The laser welding device 12 comprises a laser welding head 13, wherein said welded joint 8 between the first and second binding element sections 7a, 7b is formed by means of a laser beam 14 (see FIG. 2d) emitted from the laser welding head. The laser welding device 12 comprises means of conventional type for directing and focusing the emitted laser beam 14 onto a desired target area.

The binding machine 1 further comprises an electronic control device 60 (very schematically illustrated in FIG. 1) for controlling the operation of the binding machine. The electronic control device 60 is connected to the laser welding device 12 and configured to control the laser welding device to direct and focus the laser beam 14 of the laser welding device onto a desired part of the binding element 3. The electronic control device 60 is also connected to the feeding device 5 and configured to control the operation thereof.

Figure 2A:
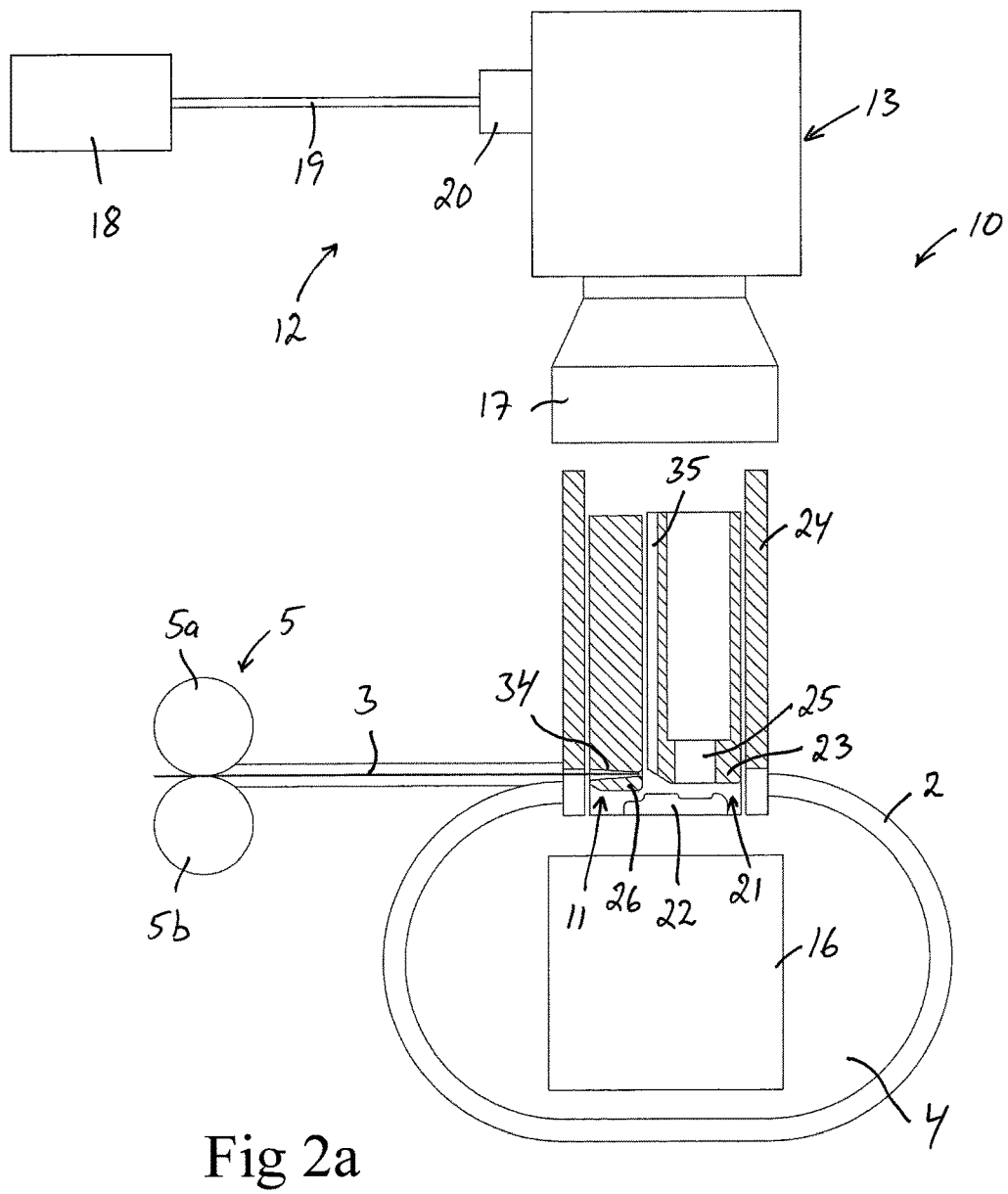
FIGS. 2a-2h are partly cut outline diagrams of parts included in the binding machine of FIG. 1, as seen at different stages during the process of securing a binding element in a loop around an object.
Figure 2B:
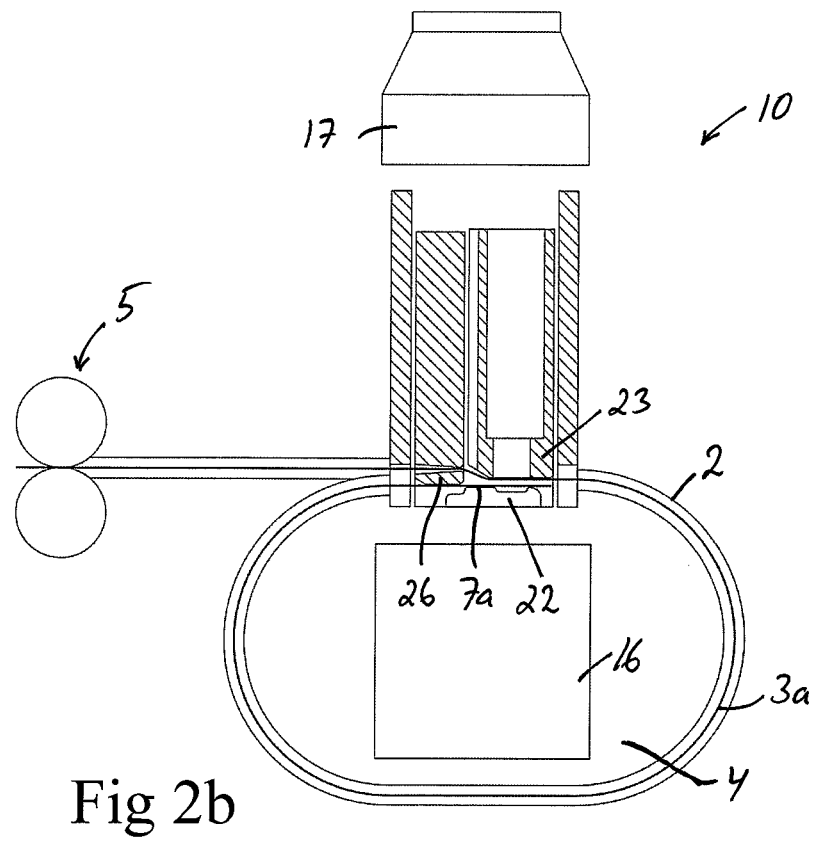
Figure 2C:
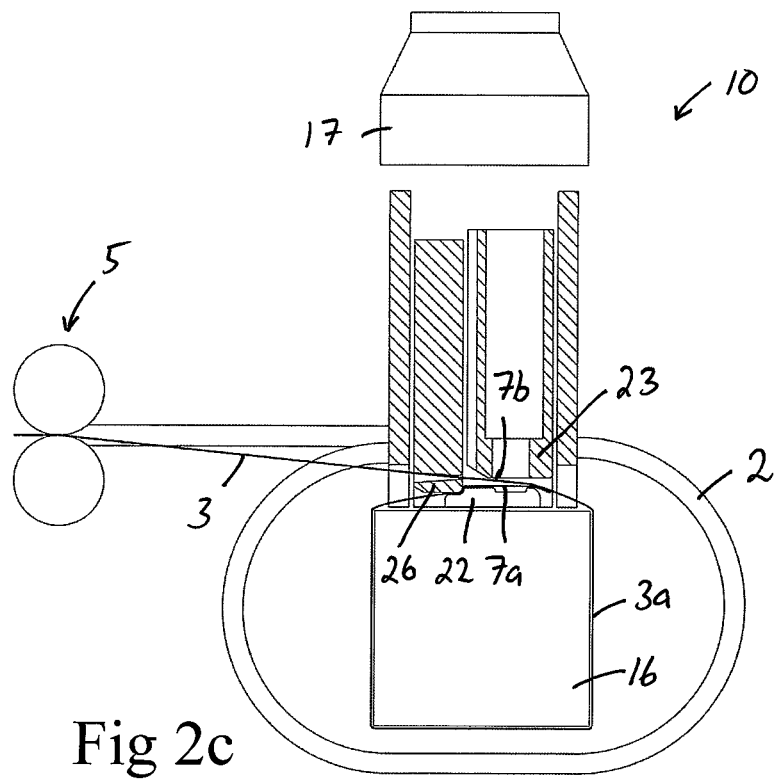
Figure 2D:
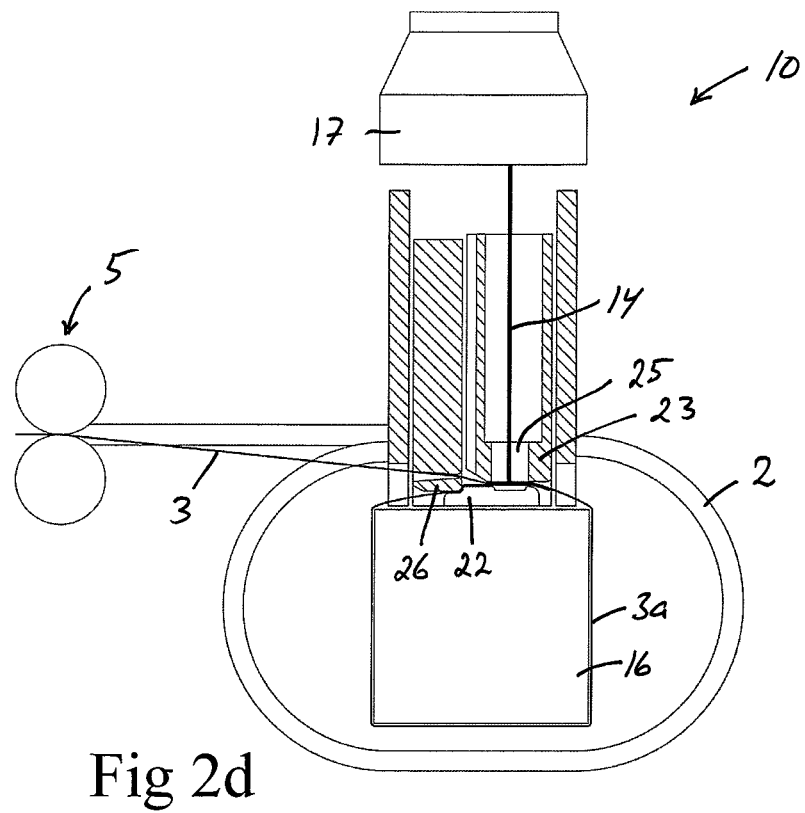
Figure 2E:
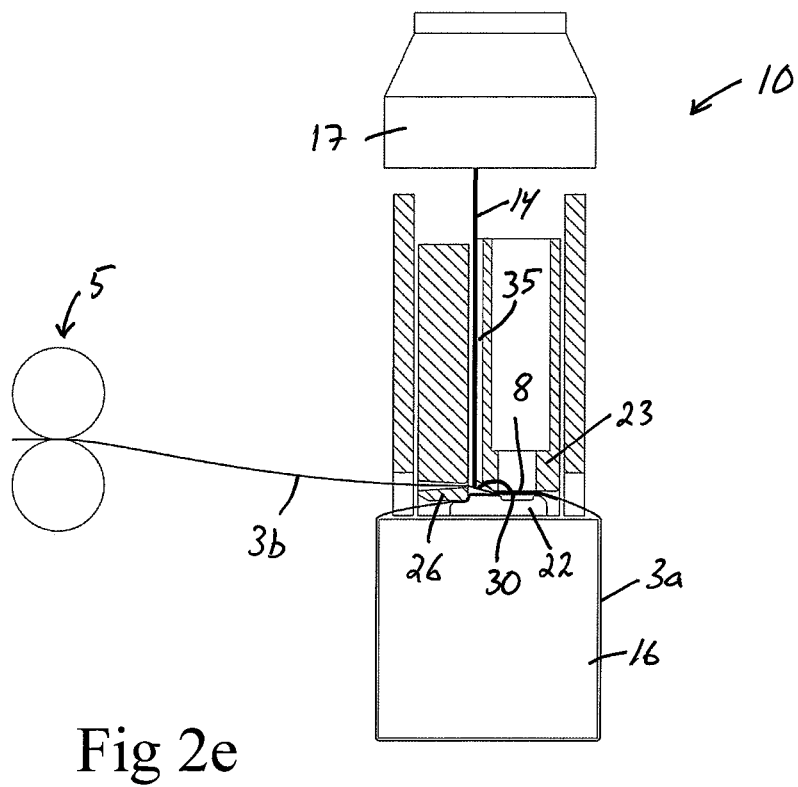
Figure 2F:
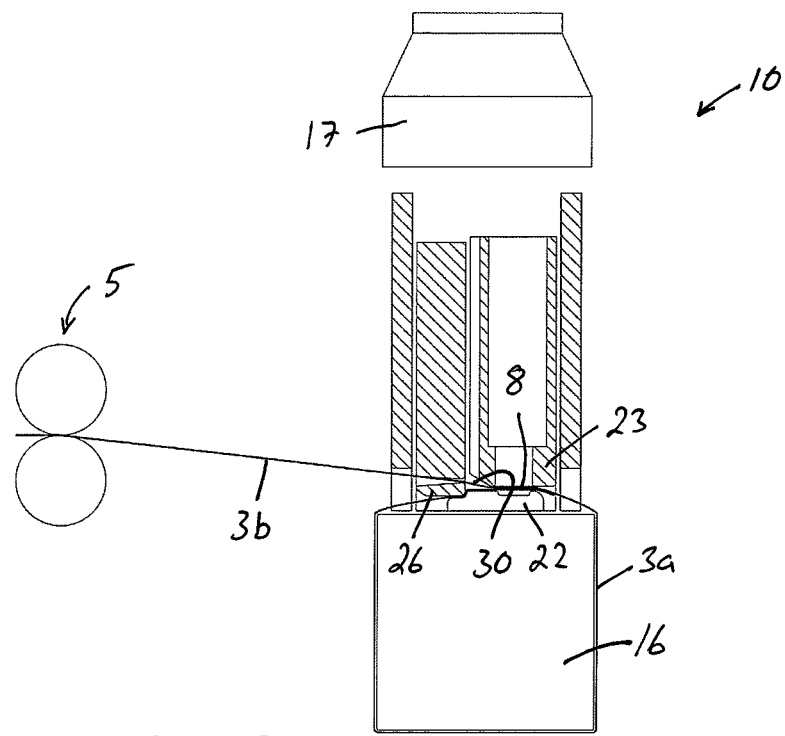
Figure 2G:
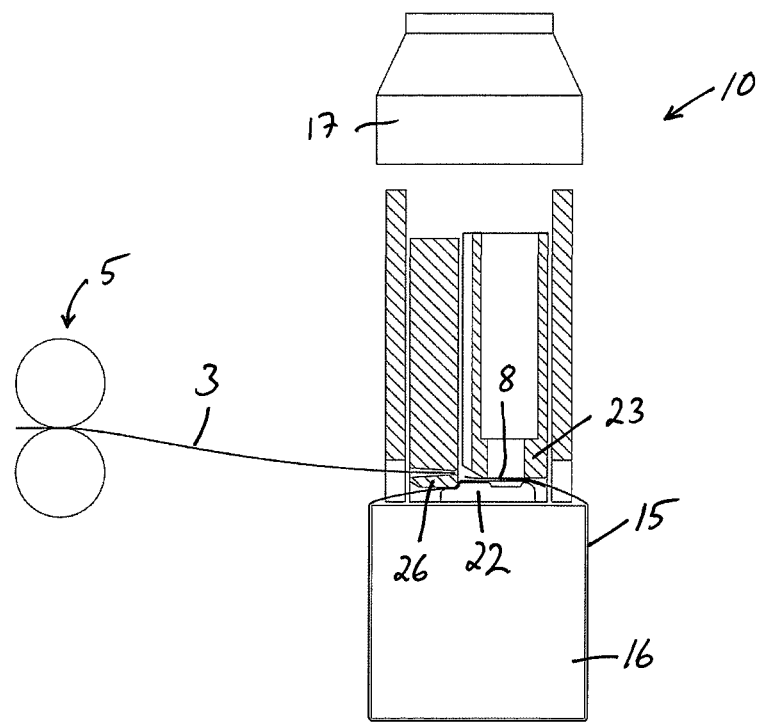
Figure 2H:
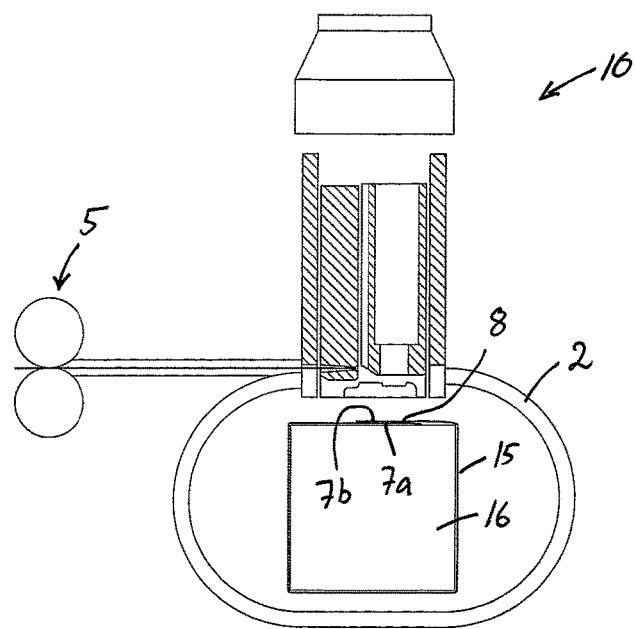

The laser welding device 12 is also configured to direct a laser beam 14 (see FIG. 2e) onto an area 30 (see FIGS. 4, 7 and 9) extending across the binding element 3 at the trailing end of the second binding element section 7b, i.e. at the end of the second binding element section 7b facing the feeding device 5, in order to reduce the tensile strength of the binding element 3 at the trailing end of the second binding element section 7b, wherein the feeding device 5 is configured to retract the binding element 3 in order to subject said area 30 to tensile stress and thereby cause the binding element to be broken off at the trailing end of the second binding element section 7b, as illustrated in FIG. 2g. Hereby, the binding element loop 15 arranged around the object or objects 16 to be bound is released from the remaining part 3b of the binding element.

The laser welding head 13 may comprise one or more computer-controlled scanning mirrors for controlling the direction and movement of the laser beam 14 emitted from the laser welding head. As an alternative, the direction and movement of the laser beam 14 may be controlled by computer-controlled movements of the entire laser welding head 13. The laser welding head 13 is provided with a focusing lens 17, through which the laser beam 14 leaves the laser welding head.

The laser welding device 12 further comprises a laser source 18 for generating the laser power required for producing the laser beam 14 used for forming the welded joint 8 between the first and second binding element sections 7a, 7b and for reducing the tensile strength of the binding element 3 at the trailing end of the second binding element section 7b. The laser source 18 can be of any type commonly used for welding. In the illustrated example, the laser source 18 is connected to the laser welding head 13 via an optical fibre cable 19, which is configured to guide the laser power generated by the laser source 18 to the laser welding head 13. The optical fibre cable 19 is in a conventional manner connected to the laser welding head 13 by means of an optical connector 20 comprising focusing optics. The focal point of the laser beam 14 emitted from the laser welding head 13 may be adjusted by computer-controlled movements of one or more optical members included in the focusing optics of the optical connector 20.

The sealing unit 10 illustrated in FIGS. 2a-2h comprises a squeezing device 21 for squeezing the second binding element section 7b against the first binding element section 7a with the second binding element section 7b overlapping the first binding element section 7a, wherein the squeezing device 21 is configured to keep the second binding element section 7b squeezed against the first binding element section 7a during the moment when the welded joint 8 between the first and second binding element sections 7a, 7b is formed by the laser welding device 12. In the illustrated example, the sealing unit 10 comprises a support member 22 for supporting the first binding element section 7a, and the squeezing device 21 comprises a squeezing member 23 which is configured to co-operate with the support member 22 and which is moveably mounted to a housing 24 of the sealing unit 10. The first and second binding element sections 7a, 7b are receivable in a space between the squeezing member 23 and the support member 22 and the squeezing member 23 is moveable in relation to the support member 22 between a retracted first position (see FIGS. 2a-2c and 2h), in which the squeezing member 23 is retracted from the support member 22, and an advanced second position (see FIGS. 2d-2g), in which the squeezing member 23 is pressed against the support member 22 in order to squeeze together the first and second binding element sections 7a, 7b. The squeezing member 23 is provided with a passage 25, through which a laser beam 14 from the laser welding head 13 of the laser welding device 12 may be directed towards an area on the second binding element section 7b, in order to form the welded joint 8 between the first and second binding element sections 7a, 7b, when the squeezing member 23 is in said second position and keeps the first and second binding element sections 7a, 7b squeezed together between the squeezing member 23 and the support member 22. The squeezing member 23 is moveable between said first and second positions by means of an actuator (not shown), which may be electrically, pneumatically or hydraulically driven.

The electronic control device 60 is configured to control the laser welding device 12 to form the welded joint 8 between the first and second binding element sections 7a, 7b in a first step and thereafter control the laser welding device 12 to reduce the tensile strength of the binding element 3 at the trailing end of the second binding element section 7b in a subsequent second step. The squeezing member 23 is preferably configured to remain in its advanced second position when the laser beam 14 is directed onto the above-mentioned area 30 at the trailing end of the second binding element section 7b. The squeezing member 23 is preferably also configured to remain in its advanced second position during the moment when the feeding device 5 retracts the binding element 3 in order to break off the binding element at the trailing end of the second binding element section 7b. In this case, the tensile force in the binding element 3 is at least partly taken up by the squeezing member 23 and the support member 22. As an alternative, the squeezing member 23 may be configured to be in its retracted first position during the moment when the feeding device 5 retracts the binding element 3 in order to break off the binding element at the trailing end of the second binding element section 7b. In the latter case, the tensile force in the binding element 3 is taken up by the welded joint 8 between the first and second binding element sections 7a, 7b.

In the sealing unit 10 illustrated in FIGS. 2a-2h, the gripping device 11 comprises a clamping member 26 which is moveably mounted to the housing 24. The clamping member 26 is moveable in relation to the support member 22 between a retracted position (see FIGS. 2a, 2b and 2h), in which the clamping member 26 is retracted from the support member 22 and allows the first binding element section 7a to pass between the clamping member 26 and the support member 22, and an advanced position (see FIGS. 2c-2g), in which the clamping member 26 is pressed against the support member 22 in order to grip and lock the first binding element section 7a between the clamping member 26 and the support member 22. The clamping member 26 is moveable between said retracted and advanced positions by means of an actuator (not shown), which may be electrically, pneumatically or hydraulically driven.

In the embodiment illustrated in FIGS. 2a-2h, there is a passage 35 between the squeezing member 23 and the clamping member 26, wherein a laser beam 14 from the laser welding head 13 of the laser welding device 12 may be directed towards the above-mentioned area 30 at the trailing end the second binding element section 7b through this passage 35.

Figure 3A:
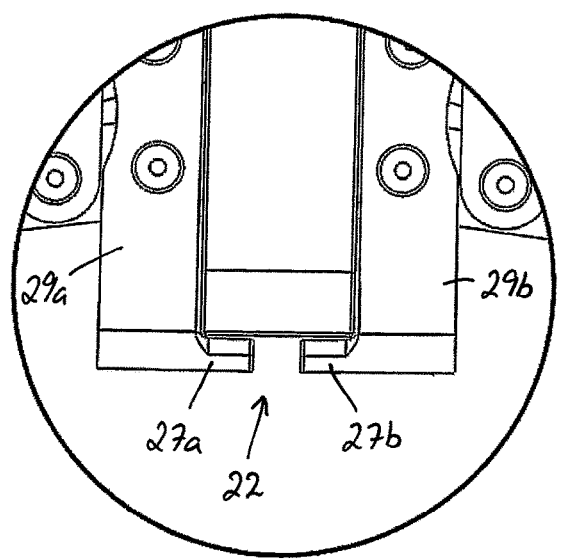
FIG. 3a is a schematic frontal view of a support member included in the binding machine of FIG. 1, as seen with two jaws of the support member in an advanced supporting position.
Figure 3B:
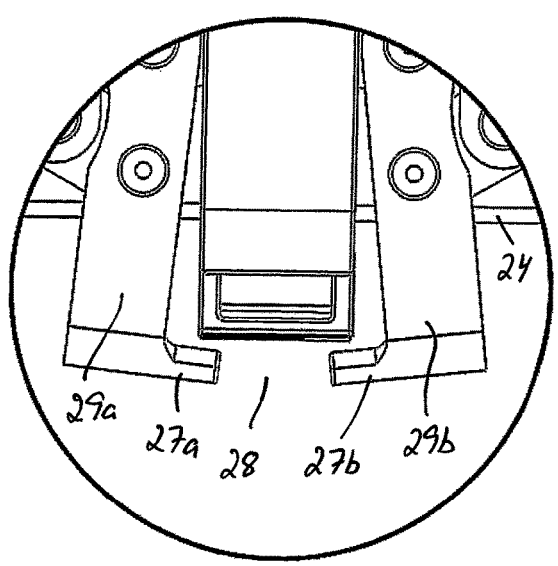
FIG. 3b is a schematic frontal view of the support member, as seen with the jaws of the support member in a retracted releasing position.

As illustrated in FIGS. 3a and 3b, the support member 22 may comprise first and second support jaws 27a, 27b located opposite each other, wherein the support jaws 27a, 27b are moveable in relation to each other between an advanced supporting position (see FIG. 3a), in which the support jaws 27a, 27b form a support for the first binding element section 7a, and a retracted releasing position (see FIG. 3b), in which the support jaws 27a, 27b are retracted from each other in order to allow the first and second binding element sections 7a, 7b, after having been joined to each other, to pass through the gap 28 between the support jaws 27a, 27b. In the illustrated example, each support jaw 27a, 27b is fixed to a pivot arm 29a, 29b, which in its turn is pivotally mounted to the housing 24 of the sealing unit 10. Thus, in this case, the support jaws 27a, 27b are pivotable between the supporting and releasing positions. As an alternative, the support jaws could be linearly moveable between the supporting and releasing positions. The support jaws 27a, 27b are moveable between the supporting and releasing positions by means of an actuator (not shown), which may be electrically, pneumatically or hydraulically driven.

The gripping device 11 and the squeezing device 21 may of course also have any other suitable design in addition to the designs illustrated in FIGS. 2a-2h. The operation of the gripping device 11 and the squeezing device 21 is controlled by the electronic control device 60.

According to a first alternative, the electronic control device 60 is configured to control the laser welding device 12 to reduce the tensile strength of the binding element 3 at the trailing end of the second binding element section 7b by heating the above-mentioned area 30 at the trailing end of the second binding element section 7b under the effect of said laser beam 14 and without cutting or penetrating into the binding element 3. In order to heat the area 30 at the trailing end of the second binding element section 7b, the laser welding device 12 is made to sweep the laser beam 14 over the area 30 (schematically illustrated with dotted lines in FIG. 4), which extends between the longitudinal edges 31a, 31b of the binding element 3. In order to make sure that the laser beam 14 will heat the area 30 in question without cutting into the binding element 3, the focal point of the laser beam 14 is adjusted, for instance by means of the above-mentioned focusing optics of the optical connector 20, in such a manner that the laser beam is out of focus when hitting the area 30 at the trailing end of the second binding element section 7b. When the area 30 has been rapidly heated by the laser beam 14, the feeding device 5 is operated to pull the binding element 3 backwards with such a force that the binding element 3, under the effect of the tensile stress produced in the binding element between the feeding device 5 and the second binding element section 7b, is broken off at the heated area 30, as illustrated in FIG. 2g.

According to a second alternative, the electronic control device 60 is configured to control the laser welding device 12 to reduce the tensile strength of the binding element 3 at the trailing end of the second binding element section 7b by forming one or more depressions 32, 32' across the binding element 3 at the trailing end of the second binding element section 7b under the effect of the laser beam 14 so as to thereby provide a break line 33 across the binding element 3 at the trailing end of the second binding element section 7b. In this case, the laser beam 14 is made to cut into the binding element 3, but without cutting through it. The depressions 32, 32' may for instance have a depth corresponding to approximately half the thickness of the binding element 3. The laser beam 14 is preferably prevented from reaching any of the longitudinal edges 31a, 31b of the binding element 3 when forming the depressions 32, 32'. The break line 33 may be formed by several shorter depressions 32 arranged in line with each other across the binding element 3 at the trailing end of the second binding element section 7b, as illustrated in FIGS. 7 and 8, or by one longer depression 32' extending across the binding element 3 at the trailing end of the second binding element section 7b, as illustrated in FIGS. 9 and 10. When the break line 33 has been formed by the laser beam 14, the feeding device 5 is operated to pull the binding element 3 backwards with such a force that the binding element 3, under the effect of the tensile stress produced in the binding element between the feeding device 5 and the second binding element section 7b, is broken off at the break line 33.

The electronic control device 60 may be implemented by one single electronic control unit or by two or more mutually co-operating electronic control units.

The binding machine 1 may have the form of a strapping machine, wherein the binding element 3 is a strap of metallic or plastic material. In this case, the laser welding device 12 is configured to form the welded joint 8 as a lap joint with the second binding element section 7b overlapping the first binding element section 7a. In the examples illustrated in FIGS. 4-9, the welded joint 8 has an elliptical shape, as seen in a planar view.

However, the welded joint 8 between the overlapping binding element sections 7a, 7b may of course also have any other suitable configuration.

As an alternative, the binding machine 1 may have the form of a wire binding machine, wherein the binding element 3 is a wire of metallic material. In this case, the laser welding device 12 is configured to form the welded joint 8 as a longitudinal joint at the interface between the first and second binding element sections 7a, 7b, wherein the second binding element section 7b is located in parallel with and at the side of the first binding element section 7a, as illustrated in FIG. 11.

An operating sequence for securing a binding element 3 in the form of a strap in a loop around an object 16 by means of the above-described binding machine 1 will now be described with reference to FIGS. 2a-2h. In the embodiment illustrated in FIGS. 2a-2h, the laser welding device 12 is configured to form the welded joint 8 as a lap joint with the second binding element section 7b overlapping the first binding element section 7a.

In a first step, a motor of the feeding device 5 is operated in a first direction in order to feed the binding element 3 forwards from the supply coil 6, through a passage 34 (see FIG. 2a) in the clamping member 26 and into the guide track 2. During the feeding of the binding element 3, the clamping member 26 is in its retracted position, the squeezing member 23 in its retracted first position and the support jaws 27a, 27b in the supporting position. The binding element 3 is fed forwards in the guide track 2 in a loop around the object 16. The leading end of the binding element 3 will then leave the guide track 2 and pass through the gap between the clamping member 26 and the support member 22 (see FIG. 2b), whereupon the leading end of the binding element 3 actuates a stop member (not shown) and the motor of the feeding device 5 is stopped. The clamping member 26 is then moved to its advanced position in order to grip the first binding element section 7a at the leading end of the binding element 3 to thereby lock the first binding element section 7a between the clamping member 26 and the support member 22. Thereafter, the motor of the feeding device 5 is reversed in order to pull the binding element 3 backwards and thereby tighten the binding element 3 around the object 16, as illustrated in FIG. 2c. As illustrated in FIGS. 2b and 2c, the sealing unit 10 is moveable in relation to the guide track 2 and configured to move towards the object 16 when the binding element 3 is tightened around the object. When the binding element 3 has been drawn tightly around the object 16, the motor of the feeding device 5 is stopped and the squeezing member 23 is moved to its advanced second position in order to squeeze together the first and second binding element sections 7a, 7b between the squeezing member 23 and the support member 22 (see FIG. 2d). The laser welding device 12 is then operated to focus a laser beam 14 onto the mutually overlapping binding element sections 7a, 7b in order to form a welded joint 8 between the binding element sections 7a, 7b and thereby secure the binding element in a loop around the object 16. Thereafter, the laser welding device 12 is operated to direct a laser beam 14 onto an area 30 across the binding element 3 at the trailing end of the second binding element section 7b in order to reduce the tensile strength of the binding element 3 at the trailing end of the second binding element section 7b, as illustrated in FIG. 2e. The part of the binding element extending between the squeezing member 23 and the feeding device 5 is with advantage held in a slacked state during the moment when the laser beam 14 is directed onto said area 30. Thereafter, the feeding device 5 is configured to retract the binding element 3 (see FIG. 2f) in order to subject said area 30 to tensile stress and thereby cause the binding element to be broken off at the trailing end of the second binding element section 7b, as illustrated in FIG. 2g. Finally, the clamping member 26 is returned to its retracted position and the squeezing member 23 to its retracted first position, whereupon the support jaws 27a, 27b are moved to the releasing position in order to release the binding element loop 15 from the sealing unit 10.

An operating sequence similar to the operating sequence described above may be used for securing a binding element 3 in the form of a metallic wire in a loop around one or more objects. In the latter case, the second binding element section 7b is guided into a position in parallel with and at the side of the first binding element section 7a, and the squeezing member 23 is replaced by a clamping member which is configured to keep the first and second binding element sections 7a, 7b in a fixed position close to each other when the laser beam is directed onto the interface between the first and second binding element sections 7a, 7b.

The invention is of course not in any way restricted to the embodiments described above. On the contrary, many possibilities to modifications thereof will be apparent to a person with ordinary skill in the art without departing from the basic idea of the invention such as defined in the appended claims. The binding machine according to the present invention may for instance be design for co-operation with a compacting machine in order to bind a coil of wire compacted by the compacting machine. In the latter case, several sealing units are mounted to the compacting machine and used simultaneously in order to apply binding element loops at different positions around the compacted coil of wire, wherein each binding element loop extends along the inside of the coil through a central axial opening therein and along the outside of the coil.

The invention claimed is:

1. A binding machine comprising:
a feeding device (5) for feeding an elongated binding element (3), in the form of a wire or strap, into a loop around a space (4) configured for receiving one or more objects (16) to be bound and subsequently retracting the binding element (3) to draw it tightly around one or more objects (16) received in said space (4);

a gripping device (11) for gripping and locking a first binding element section (7a) at the leading end of the binding element after the feeding of the binding element into the loop around said space (4) to form a looped part (3a) of the binding element;

a laser welding device (12) for forming a welded joint (8) between said first binding element section (7a) and an adjoining second binding element section (7b) at the trailing end of the looped part (3a) of the binding element to thereby secure the looped part (3a) of the binding element around said one or more objects (16); and an electronic control device (60), wherein the electronic control device (60) is configured to control the laser welding device (12) to direct a laser beam (14) onto an area (30) across the binding element (3) at the trailing end of the second binding element section (7b) to reduce the tensile strength of the binding element (3) at the trailing end of the second binding element section (7b), and the electronic control device (60) is configured to control the feeding device (5) to retract the binding element (3) to subject said area (30) to tensile stress and thereby cause the binding element to be broken off at the trailing end of the second binding element section (7b).

2. A binding machine according to claim 1, wherein the electronic control device (60) is configured to control the laser welding device (12) to reduce the tensile strength of the binding element (3) at the trailing end of the second binding element section (7b) by heating said area (30) under the effect of said laser beam (14) and without cutting into the binding element.

3. A binding machine according to claim 2, wherein the binding machine (1) comprises a squeezing device (21) for squeezing the second binding element section (7b) against the first binding element section (7a) with the second binding element section (7b) overlapping the first binding element section (7a), and the electronic control device (60) is configured to control the squeezing device (21) to keep the second binding element section (7b) squeezed against the first binding element section (7a) during the moment when the welded joint (8) between the first and second binding element sections (7a, 7b) is formed by the laser welding device (12).

4. A binding machine according to claim 3, wherein the binding machine (1) comprises a support member (22) for supporting the first binding element section (7a);

the squeezing device (21) comprises a squeezing member (23) which is configured to co-operate with the support member (22), the first and second binding element sections (7a, 7b) are receivable in a space between the squeezing member (23) and the support member (22) and the squeezing member (23) is moveable in relation to the support member (22) between a retracted first position, in which the squeezing member (23) is retracted from the support member (22), and an advanced second position, in which the squeezing member (23) is pressed against the support member (22) to squeeze together the first and second binding element sections (7a, 7b); and the squeezing member (23) is provided with a passage (25), through which a laser beam (14) from the laser welding head (13) of the laser welding device (12) may be directed towards an area on the second binding element section (7b) when the squeezing member (17) is in said second position and keeps the first and second binding element sections (7a, 7b) squeezed together between the squeezing member (23) and the support member (22).

5. A binding machine according to claim 2, wherein the electronic control device (60) is configured to control the laser welding device (12), to heat said area (30), to sweep the laser beam (14) over the area (30) with the laser beam out of focus.

6. A binding machine according to claim 5, wherein the binding machine (1) comprises a squeezing device (21) for squeezing the second binding element section (7b) against the first binding element section (7a) with the second binding element section (7b) overlapping the first binding element section (7a), and the electronic control device (60) is configured to control the squeezing device (21) to keep the second binding element section (7b) squeezed against the first binding element section (7a) during the moment when the welded joint (8) between the first and second binding element sections (7a, 7b) is formed by the laser welding device (12).

7. A binding machine according to claim 6, wherein the binding machine (1) comprises a support member (22) for supporting the first binding element section (7a);

the squeezing device (21) comprises a squeezing member (23) which is configured to co-operate with the support member (22), the first and second binding element sections (7a, 7b) are receivable in a space between the squeezing member (23) and the support member (22) and the squeezing member (23) is moveable in relation to the support member (22) between a retracted first position, in which the squeezing member (23) is retracted from the support member (22), and an advanced second position, in which the squeezing member (23) is pressed against the support member (22) to squeeze together the first and second binding element sections (7a, 7b); and the squeezing member (23) is provided with a passage (25), through which a laser beam (14) from the laser welding head (13) of the laser welding device (12) may be directed towards an area on the second binding element section (7b) when the squeezing member (17) is in said second position and keeps the first and second binding element sections (7a, 7b) squeezed together between the squeezing member (23) and the support member (22).

8. A binding machine according to claim 1, wherein the electronic control device (60) is configured to control the laser welding device (12) to reduce the tensile strength of the binding element (3) at the trailing end of the second binding element section (7b) by forming one or more depressions (32; 32') across the binding element (3) at the trailing end of the second binding element section (7b) under the effect of said laser beam (14) to thereby provide a break line (33) across the binding element (3) at the trailing end of the second binding element section (7b).

9. A binding machine according to claim 8, wherein the binding machine (1) comprises a squeezing device (21) for squeezing the second binding element section (7b) against the first binding element section (7a) with the second binding element section (7b) overlapping the first binding element section (7a), and the electronic control device (60) is configured to control the squeezing device (21) to keep the second binding element section (7b) squeezed against the first binding element section (7a) during the moment when the welded joint (8) between the first and second binding element sections (7*a*, 7*b*) is formed by the laser welding device (12).

10. A binding machine according to claim 9, wherein the binding machine (1) comprises a support member (22) for supporting the first binding element section (7*a*);

the squeezing device (21) comprises a squeezing member (23) which is configured to co-operate with the support member (22), the first and second binding element sections (7*a*, 7*b*) are receivable in a space between the squeezing member (23) and the support member (22) and the squeezing member (23) is moveable in relation to the support member (22) between a retracted first position, in which the squeezing member (23) is retracted from the support member (22), and an advanced second position, in which the squeezing member (23) is pressed against the support member (22) to squeeze together the first and second binding element sections (7*a*, 7*b*); and the squeezing member (23) is provided with a passage (25), through which a laser beam (14) from the laser welding head (13) of the laser welding device (12) may be directed towards an area on the second binding element section (7*b*) when the squeezing member (17) is in said second position and keeps the first and second binding element sections (7*a*, 7*b*) squeezed together between the squeezing member (23) and the support member (22).

11. A binding machine according to claim 1, wherein the binding machine (1) comprises a squeezing device (21) for squeezing the second binding element section (7*b*) against the first binding element section (7*a*) with the second binding element section (7*b*) overlapping the first binding element section (7*a*), and the electronic control device (60) is configured to control the squeezing device (21) to keep the second binding element section (7*b*) squeezed against the first binding element section (7*a*) during the moment when the welded joint (8) between the first and second binding element sections (7*a*, 7*b*) is formed by the laser welding device (12).

12. A binding machine according to claim 11, wherein the binding machine (1) comprises a support member (22) for supporting the first binding element section (7*a*);

the squeezing device (21) comprises a squeezing member (23) which is configured to co-operate with the support member (22), the first and second binding element sections (7*a*, 7*b*) are receivable in a space between the squeezing member (23) and the support member (22) and the squeezing member (23) is moveable in relation to the support member (22) between a retracted first position, in which the squeezing member (23) is retracted from the support member (22), and an advanced second position, in which the squeezing member (23) is pressed against the support member (22) to squeeze together the first and second binding element sections (7*a*, 7*b*); and the squeezing member (23) is provided with a passage (25), through which a laser beam (14) from the laser welding head (13) of the laser welding device (12) may be directed towards an area on the second binding element section (7*b*) when the squeezing member (17) is in said second position and keeps the first and second binding element sections (7*a*, 7*b*) squeezed together between the squeezing member (23) and the support member (22).

13. A binding machine according to claim 12, wherein the gripping device (11) comprises a clamping member (26) which is moveable in relation to said support member (22) between a retracted position, in which the clamping member (26) is retracted from the support member (22) and allows the first binding element section (7*a*) to pass between the clamping member (26) and the support member (22), and an advanced position, in which the clamping member (26) is pressed against the support member (22) to grip and lock the first binding element section (7*a*) between the clamping member (26) and the support member (22).

14. A binding machine according to claim 12, wherein said support member (22) comprises first and second support jaws (27*a*, 27*b*) located opposite each other, and the first and second support jaws (27*a*, 27*b*) are moveable in relation to each other between an advanced supporting position, in which the first and second support jaws (27*a*, 27*b*) form a support for the first binding element section (7*a*), and a retracted releasing position, in which first and second support jaws (27*a*, 27*b*) are retracted from each other to allow the first and second binding element sections (7*a*, 7*b*) to pass through a gap (28) between the first and second support jaws (27*a*, 27*b*).

15. A binding machine according to claim 1, wherein the binding machine (1) is a strapping machine, and the binding element (3) is a strap of metallic or plastic material.

16. A binding machine according to claim 1, wherein the binding machine (1) is a wire binding machine, wherein the binding element (3) is a wire of metallic material.

17. A method for securing an elongated binding element (3), in the form of a wire or strap, around one or more objects, wherein the method comprises the steps of:

positioning said one or more objects in an object receiving space (4) of a binding machine (1);

feeding the binding element (3) into a loop around said space (4) by a feeding device (5) included in the binding machine (1);

gripping and locking a first binding element section (7*a*) at the leading end of the binding element (3) after the feeding of the binding element into the loop around said space (4) to form a looped part (3*a*) of the binding element;

retracting the binding element (3) with the feeding device (5) to draw it tightly around said one or more objects; and forming, with a laser welding device (12) included in the binding machine (1), a welded joint (8) between said first binding element section (7*a*) and an adjoining second binding element section (7*b*) at the trailing end of the looped part (3*a*) of the binding element to thereby secure the looped part (3*a*) of the binding element around said one or more objects, after the formation of said welded joint (8) between the first and second binding element sections (7*a*,7*b*), directing a laser beam (14) from the laser welding device (12) onto an area (30) across the binding element (3) at the trailing end of the second binding element section (7*b*) to reduce the tensile strength of the binding element (3) at the trailing end of the second binding element section (7*b*), and retracting the binding element (3) with the feeding device (5) to subject said area (30) to tensile stress and thereby cause the binding element (3) to be broken off at the trailing end of the second binding element section (7*b*).

18. A method according to claim 17, wherein the tensile strength of the binding element (3) at the trailing end of the second binding element section (7*b*) is reduced by heating said area (30) under the effect of said laser beam (14) and without cutting into the binding element.

19. A method according to claim 18, wherein the laser beam (14), to heat said area (30), is swept over the area (30) with the laser beam out of focus.

20. A method according to claim 17, wherein the tensile strength of the binding element (3) at the trailing end of the second binding element section (7b) is reduced by forming one or more depressions (32; 32') across the binding element (3) at the trailing end of the second binding element section (7b) under the effect of the laser beam (14) to thereby provide a break line (33) across the binding element (3) at the trailing end of the second binding element section (7b).

* * * * *